United States Patent Office 3,761,401
Patented Sept. 25, 1973

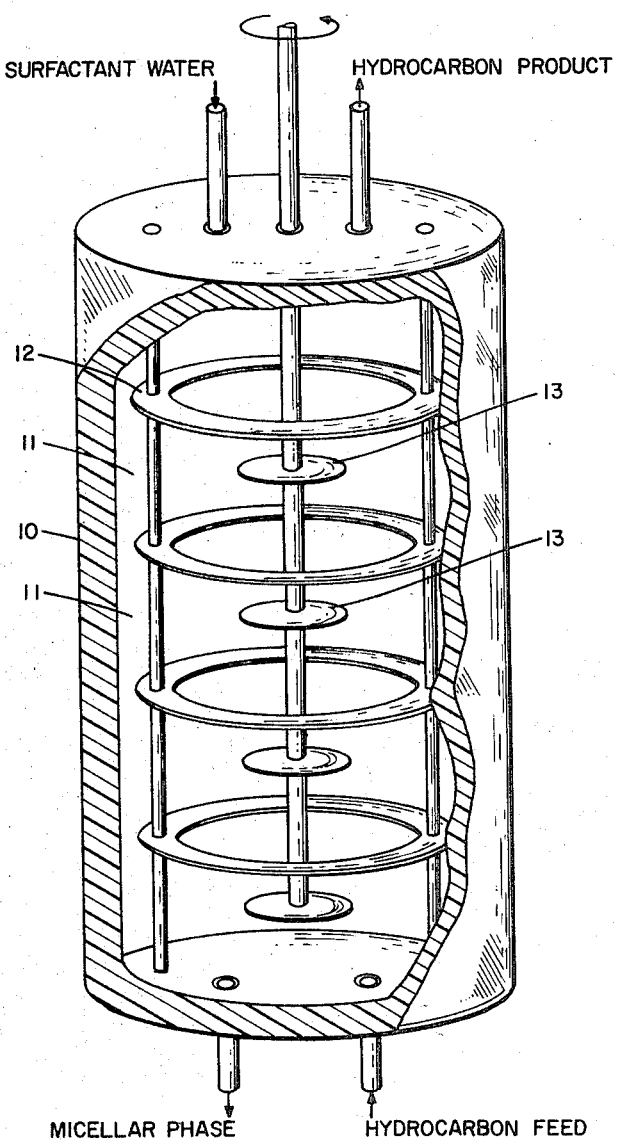

3,761,401
HYDROCARBON EXTRACTION PROCESS USING MICELLAR SYSTEMS
John R. Coleman, Jr., Burghausen, Germany, and Mark A. Plummer, Littleton, Colo., assignors to Marathon Oil Company, Findlay, Ohio
Filed Apr. 26, 1971, Ser. No. 137,383
Int. Cl. C07c 7/10; C10g 17/04
U.S. Cl. 208—311
15 Claims

ABSTRACT OF THE DISCLOSURE

An extraction process for separating hydrocarbons according to type (e.g., aromatics from paraffins) by (a) intimately contacting a mixture of the hydrocarbon types with water plus a surfactant to form a micellar system, (b) allowing a separate organic phase to form above or below said micellar system, said organic phase being enriched in one of the types of hydrocarbons, and (c) separating the organic phase from the micellar system. The process may be repeated for further enrichment. Various electrolytes and cosurfactants may additionally be used in forming the micellar system, which hydrocarbon is enriched in the organic phase, can be controlled by varying the equivalent weight of the surfactant employed.

CROSS REFERENCES TO RELATED APPLICATIONS

The following applications relate to the general field of the present invention: Ser. No. 93,201, filed Nov. 27, 1970.

BACKGROUND OF THE INVENTION

Field of the invention

The present invention relates to the field of extraction of aromatic hydrocarbons generally classified in U.S. Patent Office Class 208, subclasses 308 and 311.

Description of the prior art

Water-surfactant mixtures have been used to separate solids e.g., in mineral flotation processes. However, the use of such mixtures for extracting aromatic hydrocarbons has not been previously taught, to applicants' knowledge.

SUMMARY OF THE INVENTION

General state of the invention

The present invention separates various types of hydrocarbons, for example, aromatics from aliphatics. According to the invention, mixtures of hydrocarbons are intimately contacted with water and surfactants to form micellar systems, and an organic layer is allowed to form either above or below the micellar system. This organic layer is enriched in one of the types of hydrocarbons found in the mixture. The process may be repeated to provide increasingly greater enrichment.

The invention further relates to the discovery that the separation of types of hydrocarbons can be controlled by varying the equivalent weight of the surfactants, e.g., petroleum sulfonate, employed. As shown by the examples, a hexane-rich organic phase can be separated from a benzene-hexane-water-petroleum sulfonate micellar system by employing a sulfonate having an equivalent weight of 343. In contrast, a benzene-rich organic phase can be separated from the same micellar system by employing a sulfonate having an equivalent weight of 425. An intermediate sulfonate having an equivalent weight of 387 produces little or no enrichment of the organic phase in either benzene or hexane.

Utility of the invention

The invention permits the separation of organic liquids, especially organic solvents, to obtain relatively pure forms suitable for use in cleaning operations, paint solvents, pure hydrocarbon starting materials for petrochemicals, upgraded fuels, and a wide variety of other uses to which such organic liquids are conventionally applied.

BRIEF DESCRIPTION OF THE DRAWINGS

The drawing is a schematic representation of a continuous flow system for practicing the present invention.

DESCRIPTION OF THE PREFERRED EMBODIMENTS

Starting materials: Hydrocarbon mixtures for separation by the techniques of the present invention include mixtures of various types of hydrocarbons including particularly olefin/paraffin mixtures, aromatic/olefin mixtures, and especially mixtures of aromatic with paraffinic hydrocarbons. The mixtures may contain 2, 3, or even more types of hydrocarbons and may be composed of 2 or more specific compounds. The invention has particular utility in the separation of mixtures of many compounds, e.g., naphthas, kerosenes, gasolines, etc.

Exemplary of hydrocarbons which can be separated are: hexanes/toluene, pentene-1/pentane, hexane-1/benzene, and hexane/benzene mixtures.

Of course, the hydrocarbons can be substituted with groups which do not interfere with the process of the present invention, e.g., CN, $NO_3$, $NH_2$, Cl, F, Br, etc. Such substituents may vary the optimum equivalent weight for the separation but this can be determined by routine trial runs once the invention is understood by a reading of the present application.

Surfactants: Surfactants (see Surface Chemistry, Lloyd I. Osyson, Chapter 8, (and the references cited therein) Reinhold, 1962), for use with the present invention include non-ionic e.g., (alkylphenols, sugar esters and fatty acids), anionic e.g., (sodium dodecylbenzene, ammonium dodecyl sulfonate and ammonium naphthalene sulfonate), and cationic e.g., (primary amines, ethoxylated amines and quaternary ammonium compounds). Water soluble petroleum sulfonates are preferred as surfactants. Alkylaryl sulfonates, aromatic heterocyclic or aromatic carbocyclic, mono- or poly- and alkane sulfonates, primary, secondary or tertiary can be used. The most preferred surfactants are alkyl aromatic sulfonates. Mixtures of surfactants can, of course, be employed with the invention. A particularly preferred mixture is one obtained by the sulfonation of a gas-oil or similar hydrocarbon feedstock with $SO_3$ according to conventional techniques or according to the techniques of copending United States patent application Ser. No. 147,088, filed May 26, 1971.

Preferably from 0.0001 to about 1.0, more preferably from 0.01 to about 0.8, and most preferably from 0.1 to about 0.5 pound of surfactant will be employed for each pound of water in the micellar systems used with the present invention. Examples of other surfactants include sodium glyceryl monolaurate sulfate, diethylene-glycol sulfate, glycerol disulfoacetate monomyristate, p-toluidine sulfate laurate, p-chloroaniline sulfate laurate, p-sodium sulfato oleylethylanilide, triethanolamine myristate, N-methyltaurine oleamide, pentaerythritol monostearate, polyglycerol monolaurate, triethanolamine oleate, morpholine stearate, hexadecyl trimethylammonium chloride, ditetradecyl dimethyl ammonium chloride, n-dodecyldiethyleneglycol sulfate, monobutylphenyl phenol sodium sulfate, and triethanolamine laurate or triethanolamine oleate.

Equivalent weight of surfactant: By "equivalent weight" of the surfactant is meant the average molecular weight divided by the average number of surface-active groups per molecule. The optimum equivalent weight of the surfactant will vary with the type of hydrocarbons to be separated according to the invention. For example, in separating benzene from mixtures with hexane, a petroleum sulfonate type of surfactant having an equivalent weight of approximately 343 gives good separation of a benzene/hexane mixture as shown in Example III. A similar petroleum sulfonate having an equivalent weight of approximately 387 gives virtually not separation of benzene as shown in Examples IV through VI. This optimization may readily be accomplished by conducting routine trial runs with the particular surfactant and the particular organic mixture to be separated. In general, however, the equivalent weights of the surfactant will fall within the range of from about 200 to about 500, more preferably from about 250 to about 450, and most preferably from about 300 to 400.

Water: Water for use with the present invention can be of normal muncipal water purity but, where water will be recycled it will be preferable to employ deionized or distilled water.

From 0.5 to about 10, more preferaby from 1 to about 8, and most preferably from 2 to about 6 pounds of water will be employed per pound of hydrocarbon in the micellar systems of the invention.

Cosurfactants: While not necessary to the practice of the invention, in specialized instances, cosurfactants may be employed in the micellar systems. The most preferred cosurfactants for use with the present invention are those which are soluble in water and are insoluble in the hydrocarbon phase of the particular system being used.

Some suitable cosurfactants for use with the present invention are: nonylphenol, 2-octanol, nonylphenol-polyoxyethylene compounds containing about 40 to 50% by weight ethylene oxide and marketed by Aquaness Chemical Company under the designation OX–126, hexylcarbitol, Pluracol P1010 (polypropyleneglycol manufactured by Wyandotte Chemicals Corporation), n-amyl alcohol, cresol, octylphenol, plus many other commercial tradename products.

Also useful as cosurfactants with the present invention are alkanols, particularly lower alkanols and most preferably those having less than about four carbon atoms in the principal chain. Most preferred consurfactants include: isopropyl alcohol, and methyl alcohol and ethyl alcohol, secondary butyl alcohol, tertiary butyl alcohol, tertiary amyl alcohol, and lower alkyl ketones such as acetone.

Electrolytes: Though not necessary to the present invention, electrolytes may be employed in specialized circumstances. Suitable electrolytes include inorganic salts. Among the preferred polyelectrolytes will be alkali metal chlorides, e.g. NaCl, NaBr, LiCl, KBr, etc., alkali metal hydroxides, e.g., KOH, NaOH, LiOH, etc., water soluble metal nitrates or sulfates, e.g., $NaNO_3$, $Cr(NO_3)$, $(NA_4)_2SO_4, K_2SO_4$ and $Na_2SO_4$.

Temperature: While not narrowly critical, the temperature for conducting the present invention will generally be in the range of from about 30 to about 300, more preferably from about 50 to about 150, and most preferably from about 70 to about 130° F. in the zone where the micellar solution is present. Temperature should, of course, be above the freezing point and below the boiling point of the mixture under the conditions employed.

Pressure: Pressure is not narrowly critical and will generally be preferably approximately atmospheric. However, pressures in the range of from about 0.1 to about 200, more preferably from 0.8 to about 20, and most preferably from 1.0 to about 5.0 atmospheres can be employed with the invention.

Time: The time of contact will be that which is sufficient to cause the formation of the micellar system, plus the time required to reach phase equilibria and plus the time which is required to permit the organic phase to separate. These times can readily be determined by routine trial runs, but will generally be in the range of from about 0.001 to about 100 hours, more preferably 0.001 to 10 hours, and most preferably from 0.1 to 1 hour.

Batch or continuous basis: While the examples describe the invention on a batch basis, it may, of course, be practiced on a continuous basis with continuous flows of starting materials into a mixing zone which the micellar solution is prepared, flow from the mixing zone into the separation zone where the organic phase is permitted to separate with continuous decanting, etc. In both batch and continuous processes it will be preferable to recycle materials, particularly sulfonate and water.

EXAMPLES

Examples I–X: Each of the following examples is run by first mixing together the surfactant and water in a separatory funnel of about 1 liter capacity, then adding the hydrocarbon, hand shaking every half hour for two hours at room temperature. The hydrocarbon (top) phase was then separated by drawing off the micellar bottom phase. Starting materials, compositions and results are as reported in Table 1.

TABLE 1.—SELECTIVE EXTRACTION OF BENZENE-HEXANE MIX WITH AQUEOUS MARATHON SULFONATE

| Example | Run number | Solv. Comp.[1] wt. percent | | Solv./oil[2] | | Phase split[3] | | | Phase composition (wt. percent) | | | | | | Component distribution (wt. percent) | | | | | Benzene selectivity coeff.[4] |
|---|---|---|---|---|---|---|---|---|---|---|---|---|---|---|---|---|---|---|---|---|
| | | —SO₃NH₄ | H₂O | Vol./vol. | Wt./wt. | | Volume percent | Wt. percent | —SO₃NH₄ | Salt | H₂O | Hexane | Benzene | | —SO₃NH₄ | Salt | H₂O | Hexane | Benzene | |

Sulfonate 51272[5] (equivalent weight 343)

| Example | Run number | —SO₃NH₄ | H₂O | Vol./vol. | Wt./wt. | | Volume percent | Wt. percent | —SO₃NH₄ | Salt | H₂O | Hexane | Benzene | —SO₃NH₄ | Salt | H₂O | Hexane | Benzene | Benzene selectivity coeff. |
|---|---|---|---|---|---|---|---|---|---|---|---|---|---|---|---|---|---|---|---|
| I | 63321 | 2.57 | 88.72 | 0.5 | 0.65 | Top | 66.0 | 61.3 | 0.38 | 0.20 | 2.09 | 46.5 | 46.3 | 22.09 | 66.67 | 3.57 | 91.38 | 92.77 | 2.6 |
| | | | | | | Bot | 34.0 | 38.7 | 2.80 | 0.40 | 83.40 | 1.1 | 2.8 | 86.05 | 86.67 | 89.80 | 1.38 | 3.56 | |
| II | 63321 | 2.57 | 88.72 | 1.0 | 1.63 | Top | 51.8 | 40.3 | 1.00 | 0.20 | 9.00 | 40.0 | 40.7 | 108.14 | 153.34 | 93.37 | 92.76 | 96.33 | 1.7 |
| | | | | | | Bot | 48.2 | 59.7 | 2.20 | 0.44 | 88.10 | 1.4 | 2.4 | 25.00 | 27.27 | 6.54 | 84.18 | 85.69 | |
| | | | | | | | | | | | | | | 82.03 | 95.45 | 95.11 | 4.38 | 7.45 | |
| III | 63321 | 2.57 | 88.72 | 3.0 | 4.10 | Top | 28.0 | 24.2 | 2.50 | 0.20 | 36.30 | 24.1 | 25.5 | 107.03 | 122.72 | 101.65 | 88.56 | 93.14 | 4.0 |
| | | | | | | Bot | 72.0 | 75.8 | 2.20 | 0.40 | 83.50 | 0.55 | 2.35 | 28.87 | 14.71 | 12.26 | 59.24 | 62.61 | |
| | | | | | | | | | | | | | | 80.41 | 82.35 | 88.43 | 4.24 | 18.04 | |
| | | | | | | | | | | | | | | 109.28 | 97.06 | 100.69 | 63.48 | 80.65 | |

Sulfonate 51266[6] (equivalent weight 387)

| IV | 63317 | 2.41 | 85.64 | 0.33 | 0.43 | Top | 78.8 | 74.6 | 0.57 | 0.08 | 4.09 | 44.8 | 46.5 | 56.67 | 22.80 | 11.68 | 95.41 | 99.08 | 1.4 |
| | | | | | | Bot | 21.2 | 25.4 | 1.70 | 1.06 | 91.4 | 0.5 | 0.7 | 58.33 | 91.67 | 88.61 | 0.35 | 0.49 | |
| V | 63317 | 2.41 | 85.64 | 1.00 | 1.32 | Top | 64.8 | 60.4 | 1.60 | 0.20 | 19.5 | 32.1 | 34.1 | 115.00 | 114.47 | 100.29 | 95.76 | 99.57 | 1.0 |
| | | | | | | Bot | 35.2 | 39.6 | 1.30 | 1.20 | 93.7 | 0.2 | 0.2 | 70.00 | 8.16 | 23.96 | 86.32 | 94.42 | |
| | | | | | | | | | | | | | | 37.50 | 83.67 | 75.50 | 0.37 | 0.37 | |
| VI | 63317 | 2.41 | 85.64 | 3.00 | 3.87 | Top | 54.3 | 52.1 | 3.10 | 0.52 | 54.7 | 9.2 | 13.5 | 107.50 | 91.83 | 99.46 | 86.69 | 94.79 | 1.0 |
| | | | | | | Bot | 45.7 | 47.9 | 1.10 | 1.22 | 97.6 | 0.0 | 0.0 | 83.89 | 34.25 | 41.38 | 46.08 | 67.63 | |
| | | | | | | | | | | | | | | 27.22 | 75.34 | 69.28 | 0.0 | 0.0 | |
| | | | | | | | | | | | | | | 111.11 | 109.59 | 110.66 | 46.08 | 67.63 | |

Sulfonate 35167[7] (equivalent weight 425)

| VII | 63324 | 2.41 | 87.65 | 0.51 | 0.66 | Top | 75.4 | 70.4 | 1.30 | 0.20 | 7.50 | 33.3 | 35.3 | 96.25 | 44.44 | 15.22 | 94.23 | 98.66 | 7.6 |
| | | | | | | Bot | 24.6 | 29.6 | 0.80 | 1.13 | 93.2 | 0.53 | 0.07 | 25.00 | 103.70 | 79.42 | 0.51 | 0.08 | |
| VIII | 63324 | 2.41 | 87.65 | 1.00 | 1.29 | Top | 62.8 | 58.0 | 2.20 | 0.20 | 12.2 | 33.3 | 35.3 | 121.25 | 148.14 | 94.64 | 94.74 | 98.74 | 5.3 |
| | | | | | | Bot | 37.2 | 42.0 | 0.70 | 1.14 | 93.85 | 0.53 | 0.1 | 93.22 | 8.47 | 14.24 | 87.94 | 93.17 | |
| | | | | | | | | | | | | | | 21.19 | 34.75 | 79.42 | 1.01 | 0.21 | |
| IX | 63324 | 2.41 | 87.65 | 2.03 | 2.68 | Top | 50.0 | 46.5 | 3.70 | 0.20 | 20.9 | 26.0 | 28.3 | 114.41 | 43.22 | 93.66 | 88.95 | 93.38 | 7.6 |
| | | | | | | Bot | 50.0 | 53.5 | 0.70 | 1.15 | 94.0 | 0.45 | 0.06 | 94.64 | 5.52 | 15.16 | 88.49 | 96.35 | |
| | | | | | | | | | | | | | | 20.83 | 34.97 | 78.50 | 1.75 | 0.24 | |
| X | 63324 | 5.81 | 70.29 | 1.00 | 1.29 | Top | 79.6 | 77.0 | 4.40 | 0.49 | 23.6 | 22.7 | 26.3 | 115.47 | 40.42 | 93.66 | 90.24 | 96.59 | |
| | | | | | | Bot | 20.4 | 23.0 | 2.20 | 3.75 | 90.2 | 1.03 | 0.0 | 102.80 | 32.99 | 45.63 | 79.84 | 92.47 | |
| | | | | | | | | | | | | | | 14.08 | 76.29 | 52.07 | 1.06 | 0.0 | |
| | | | | | | | | | | | | | | 116.88 | 109.28 | 97.70 | 80.90 | 92.47 | |

[1] Unaccounted portion of solvent composition represents salt, a small amount of vehicle oil, and organic portion of sulfonate.
[2] Oil used was 50 wt. percent benzene, 50 wt. percent hexane.
[3] Top phase is oil rich phase and bottom phase is water rich phase.
[4] Benzene selectivity coefficient=wt. percent benzene in benzene enriched phase/wt. percent benzene in benzene depleted phase; wt. percent hexane in benzene depleted phase/wt. percent hexane in benzene enriched phase; benzene selectivity coefficients were calculated assuming missing benzene and/or hexane was located in the oil phase.
[5] Sulfonate 51272: Wyoming heavy vacuum gas oil; 32.0% SO₃ treat; 18.71% SO₃NH₄; 3.13% salt; 17.7% H₂O; 13.75% vehicle oil.
[6] Sulfonate 51266: Wyoming heavy vacuum gas oil; 21.5% SO₃ treat; 15.75% SO₃NH₄; 6.43% salt; 5.17% H₂O; 26.34% vehicle oil.
[7] Sulfonate 35167: Michigan heavy vacuum gas oil; 10.1% SO₃ treat; 8.7% SO₃NH₄; 2.96% salt; 55.5% H₂O; 3.85% vehicle oil.

Example XI: Referring to the drawing, a petroleum sulfonate manufactured from Wyoming heavy vacuum gas oil and having an equivalent weight based on the sulfonate groups of 343 is fed to rotation disk contractor 10 which has a series of chambers 11 separated by circular baffles 12. Each chamber contains a rotary disk 13 which causes agitation of the materials within that chamber. The surfactant-water solution fed to the tower contains approximately 0.1 pound of the petroleum sulfonate per pound of water and the total surfactant/water solution is fed at a rate of approximately 300 pounds per hour. Simultaneously, 50/50 weight percent mixture of benzene and hexane is fed through the bottom of the extraction tower at a rate of approximately 100 pounds per hour. The continuous phase in the extractor is a micellar solution of water, surfactant and hydrocarbon which is enriched in benzene. This enrichment of the hydrocarbon in benzene is successively higher in each chamber when proceeding from the top of the tower to the bottom. The product withdrawn from the top of the extraction tower is substantially enriched in hexane.

The number of stages of the extraction column and the liquid hourly space velocity are readily optimized by routine trial runs. The wide variety of other liquid-liquid contacting apparatus may be employed instead of the rotating disk extraction tower, e.g., cascade mixer-settlers, packed columns, Schiebel columns having packing and propeller-type agitators, etc.

Any residual water may be removed from the overhead product stream by contact with silica gel or similar conventional adsorbents or by other conventional means. The water-surfactant mixture can be separated from the hydrocarbons in the lower product stream by distillation or other conventional means. The water-surfactant solution can then be recycled back to the tower 10.

Modifications of the invention

It should be understood that the invention is capable of a variety of modifications and variations which will be made apparent to those skilled in the art by a reading of the specification and which are to be included within the spirit of the claims appended hereto. For example, the invention may be supplemented with distillation, fractional crystallization or other techniques utilized to further separate materials from either the micellar phase of the organic phase. As mentioned above, the invention may be operated in a cascade-fashion with successively higher enrichment of the organic phase and micellar phase at each stage in the cascade.

What is claimed is:

1. In a process for the separation of hydrocarbon types from a mixture comprising two or more hydrocarbons, selected from the group consisting of aromatics and paraffins, the improvement comprising:
    (a) forming a micellar system wherein an individual micelle has a greater capacity for one of the components of said mixture and an organic phase by contacting each pound of said mixture with from about 0.5 to about 10 pounds of water containing from about 0.0001 to about 1.0 pound of a surfactant per pound of water, said surfactant having a selected equivalent weight within the range of from about 200 to about 500,
    (b) permitting a substantially organic phase to form above or below said micellar system, said organic phase being thereby enriched in aromatics when said equivalent weight is higher within said range and enriched in paraffins when said equivalent weight is lower within said range,
    (c) separating said organic phase from said micellar system.

2. A process according to claim 1 additionally comprising:
    (d) similarly forming a second micellar system from said enriched organic phase;
    (e) permitting a second organic phase to form above or below said second micellar system, said second organic phase being still further enriched in one of said types of hydrocarbon.

3. A process according to claim 1 additionally comprising:
    (f) similarly forming a second micellar system by contacting said micellar phase with additional quantities of said hydrocarbon mixture,
    (g) permitting a second organic phase to form above or below said second micellar system, said second organic phase being still further enriched in one of said types of hydrocarbons.

4. A process according to claim 2 additionally comprising:
    (h) similarly forming a second micellar system by contacting said micellar system with additional quantities of said hydrocarbon mixture,
    (i) permitting a second organic phase to form above or below said second micellar system, said second organic phase being still further enriched in one of said types of hydrocarbons.

5. A process of claim 1 wherein the hydrocarbon is enriched in said organic phase, controlled by selecting as the surfactant, a petroleum sulfonate having an appropriate equivalent weight within the range of from about 200 to about 500.

6. A process according to claim 5 wherein the mixture comprises benzene and hexane, the equivalent weight is within the range of from about 340 to about 350 and the resulting organic phase is enriched in hexane.

7. A process according to claim 1 wherein the micellar solution additionally comprises inorganic salt electrolytes.

8. A process according to claim 1 wherein the micellar system additionally comprises a cosurfactant.

9. A process according to claim 8 wherein the cosurfactant comprises an alkanol having from 1 to about 4 carbon atoms.

10. In a process for the separation of hydrocarbon types from a mixture comprising two or more hydrocarbons, selected from the group consisting of olefins and paraffins, the improvement comprising:
    (a) forming a micellar system wherein an individual micelle has a greater capacity for one of the components of said mixture and an organic phase by contacting each pound of said mixture with from about 0.5 to about 10 pounds of water containing from about 0.0001 to about 1.0 pound of a surfactant per pound of water, said surfactant having a selected equivalent weight within the range of from about 200 to about 500,
    (b) permitting a substantially organic phase to form above or below said micellar system, said organic phase being thereby enriched in olefins when said equivalent weight is higher within said range and enriched in paraffins when said equivalent weight is lower within said range,
    (c) separating said organic phase from said micellar system.

11. In a process for the separation of hydrocarbon types from a mixture comprising two or more hydrocarbons, selected from the group consisting of aromatics and olefins, the improvement comprising:
    (a) forming a micellar system wherein an individual micelle has a greater capacity for one of the components of said mixture and an organic phase by contacting each pound of said mixture with from about 0.5 to about 10 pounds of water containing from about 0.0001 to about 1.0 pound of a surfactant per pound of water, said surfactant having a selected equivalent weight within the range of from about 200 to about 500,
    (b) permitting a substantially organic phase to form above or below said micellar system, said organic phase being thereby enriched in aromatics when said equivalent weight is higher within said range and enriched in olefins when said equivalent weight is lower within said range, (c) separating said organic phase from said micellar system.

12. In a process for the separation of hydrocarbon types from a mixture comprising two or more hydrocarbons, selected from the group consisting of hexane and toluene, the improvement comprising:

(a) forming a micellar system wherein an individual micelle has a greater capacity for one of the components of said mixture and an organic phase by contacting each pound of said mixture with from about 0.5 to about 10 pounds of water containing from about 0.0001 to about 1.0 pound of a surfactant per pound of water, said surfactant having a selected equivalent weight within the range of from about 200 to about 500, (b) permitting a substantially organic phase to form above or below said micellar system, said organic phase being thereby enriched in toluene when said equivalent weight is higher within said range and enriched in hexane when said equivalent weight is lower within said range, (c) separating said organic phase from said micellar system.

13. In a process for the separation of hydrocarbon types from a mixture comprising two or more hydrocarbons, selected from the group consisting of pentene-1 and pentane, the improvement comprising:

(a) forming a micellar system wherein an individual micelle has a greater capacity for one of the components of said mixture and an organic phase by contacting each pound of said mixture with from about 0.5 to about 10 pounds of water containing from about 0.0001 to about 1.0 pound of a surfactant per pound of water, said surfactant having a selected equivalent weight within the range of from about 200 to about 500, (b) permitting a substantially organic phase to form above or below said micellar system, said organic phase being thereby enriched in pentene-1 when said organic phase being thereby enriched in pentene-1 when said equivalent weight is higher within said range and enriched in pentane when said equivalent weight is lower within said range, (c) separating said organic phase from said micellar system.

14. In a process for the separation of hydrocarbon types from a mixture comprising two or more hydrocarbons selected from the group consisting of benzene and paraffins, the improvement comprising:

(a) forming a micellar system wherein an individual micelle has a greater capacity for one of the components of said mixture and an organic phase by contacting each pound of said mixture with from about 0.5 to about 10 pounds of water containing from about 0.0001 to about 1.0 pound of a surfactant per pound of water, said surfactant having a selected equivalent weight within the range of from about 200 to about 500, (b) permitting a substantially organic phase to form above or below said micellar system, said organic phase being thereby enriched in benzene when said equivalent weight is higher within said range and enriched in paraffins when said equivalent weight is lower within said range, (c) separating said organic phase from said micellar system.

15. In a process for the separation of hydrocarbon types from a mixture comprising two or more hydrocarbons, selected from the group consisting of benzene and hexene-1, the improvement comprising:

(a) forming a micellar system wherein an individual micelle has a greater capacity for one of the components of said mixture and an organic phase by contacting each pound of said mixture with from about 0.5 to about 10 pounds of water containing from about 0.0001 to about 1.0 pound of a surfactant per pound of water, said surfactant having a selected equivalent weight within the range of from about 200 to about 500, (b) permitting a substantially organic phase to form above or below said micellar system, said organic phase being thereby enriched in benzene when said equivalent weight is higher within said range and enriched in hexene-1 when said equivalent weight is lower within said range, (c) separating said organic phase from said micellar system.

References Cited
UNITED STATES PATENTS

| | | | |
|---|---|---|---|
| 1,520,953 | 12/1924 | Johansen | 208—308 |
| 3,389,078 | 6/1968 | Elzinga et al. | 208—308 |
| 3,410,794 | 11/1968 | Li | 208—308 |
| 3,239,315 | 3/1966 | Smet | 208—311 |

DELBERT E. GANTZ, Primary Examiner

C. E. SPRESSER, Jr., Assistant Examiner

U.S. Cl. X.R.

208—308; 260—677 A, 674 R, 674 S.E.

UNITED STATES PATENT OFFICE
CERTIFICATE OF CORRECTION

Patent No. 3,761,401　　　　　　　　Dated Sept. 25, 1973

Inventor(s) J. R. Coleman, Jr., et al

It is certified that error appears in the above-identified patent and that said Letters Patent are hereby corrected as shown below:

Col. 6, Benzene selectivity coeff. column:

| | |
|---|---|
| Example VII | Delete "7.6" and substitute therefor --8.0-- |
| Example VIII | Delete "5.3" and substitute therefor --5.6-- |
| Example IX | Delete "7.6" and substitute therefor --8.2-- |
| Example X | Delete "-------" and substitute therefor --∞--. |

Signed and sealed this 16th day of July 1974.

(SEAL)
Attest:

McCOY M. GIBSON, JR.　　　　　　　C. MARSHALL DANN
Attesting Officer　　　　　　　　　Commissioner of Patents

UNITED STATES PATENT OFFICE
CERTIFICATE OF CORRECTION

Patent No. __3,761,401__        Dated __9/25/73__

Inventor(s) __John R. Coleman, Jr. et al__

It is certified that error appears in the above-identified patent and that said Letters Patent are hereby corrected as shown below:

Col. 3, line 41:        Delete "virtually not" and insert therefor --virtually no--.

Col. 4, line 49:        Delete "0.001 to 10" and insert therefor --0.01 to 10--.

Col. 5 (Table I) first line:

Delete "Districtuion" and insert therefor --Distribution--.

Footnote 2, under Table I:   Delete "59" and insert therefor --50--.

Col. 9, line 43 (Claim 13):   Delete all of line beginning with "when . . . pentene 1" (repeat)

Signed and Sealed this

Thirteenth Day of September 1977

[SEAL]

Attest:

RUTH C. MASON
*Attesting Officer*

LUTRELLE F. PARKER
*Acting Commissioner of Patents and Trademarks*